July 4, 1961
A. J. FENTON
2,991,066
LOWERING DEVICE APPLICABLE TO AUTOMOBILE SPRINGS
Filed April 27, 1959
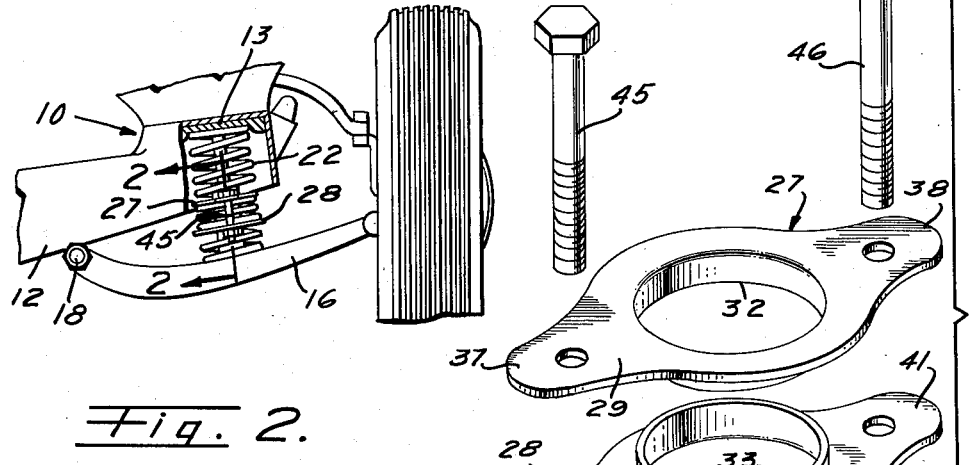
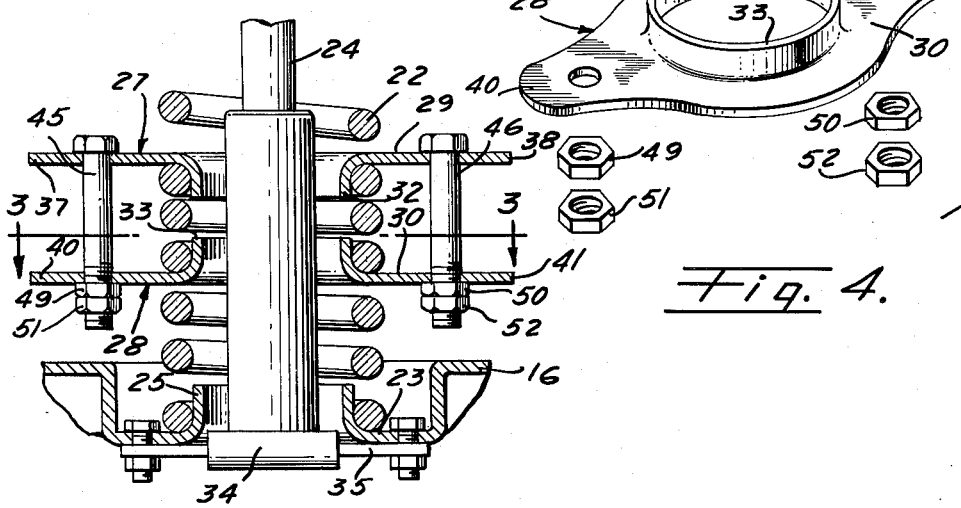
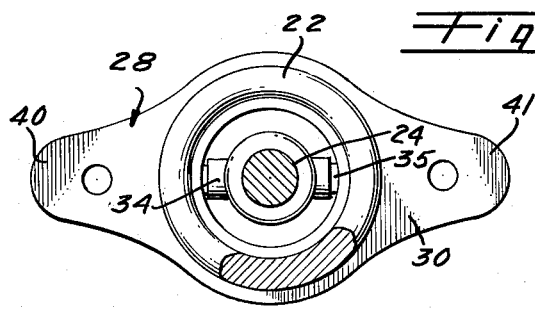
Aaron J. Fenton,
INVENTOR.
HERZIG & JESSUP,
Attorneys.
BY Albert M Herzig

United States Patent Office 2,991,066
Patented July 4, 1961

2,991,066
LOWERING DEVICE APPLICABLE TO AUTOMOBILE SPRINGS
Aaron J. Fenton, 1218 S. Stearns Drive, Los Angeles, Calif.
Filed Apr. 27, 1959, Ser. No. 809,053
8 Claims. (Cl. 267—60)

This invention relates to a method and means for lowering automobiles equipped with coil springs. The invention is particularly adapted, but not limited to the coil springs at the front end or both front and rear ends of an automobile. As exemplified herein, the invention is disclosed as applied to the front coil springs of an automobile as for example, a 1958 Chevrolet. The invention may be used to give a desired sleek appearance to the automobile by lowering the rear end or it may be lowered at both ends. The invention is particularly directed to improved lowering means capable of and adapted for use with coil springs having a shock absorber installed within the spring. The invention is however, not limited to use in that type of equipment.

In a preferred form of the invention, it comprises clamping means insertable between convolutions of a coil spring and adapted to clamp a group of adjacent convolutions together to inactivate that portion of the coil spring and to thereby lower the automobile by the amount of spacing between convolutions which is eliminated by clamping them together.

The clamping means comprises two clamping members each having a central aperture to accommodate a shock absorber within the spring. Each member has a circular lip or flange of a diameter to fit and engage within the coil convolution next adjacent to the member.

The primary object of the invention is accordingly to provide improved and simplified means particularly adapted for lowering automobiles having coil springs of the type having a shock absorber installed within the coil spring. The invention is however, not limited to such adaptation but is universally adaptable.

A further object of the invention is to provide improved means universally applicable to automobile coil springs for lowering the automobile, for lowering the center of gravity and to thereby decrease body rolling, to improve riding comfort and promote greater safety of operation.

Another object of the invention is to provide improved devices applicable to coil springs including those having a member such as a shock absorber within the spring for lowering an automobile, in the form of simplified clamp means formed to accommodate the member within the spring which are very simple in construction yet very effective for their purpose, but capable of being installed by automobile owners having limited or no mechanical skill and facilities in the way of tools and equipment.

Another object of the invention is to provide improved and simplified means for lowering an automobile having coil springs in the form of a pair of clamping brackets having central apertures shaped so as to be insertable between convolutions of a coil spring whereby a group of convolutions may be firmly clamped together by the bracket means so as to de-activate that portion of the coil spring and to lower the automobile by that amount, each bracket having means engageable with an adjacent convolution to retain the apertures centered with the axis of the coil spring.

Another object of the invention is to provide lowering means as in the foregoing objects wherein the clamping means are in the form of two bracket members each having a circular flange or lip around its central aperture, the said lips extending oppositely from their respective bracket members and each engageable with a coil convolution; the brackets having extending lugs adapting the two brackets to be attached together by bolts whereby installation is extremely simply and easy but yet very effective for its purpose and very durable and long lasting.

Further objects and numerous additional advantages of the invention will become apparent from the following detailed description and annexed drawings wherein:

FIG. 1 is a partial view showing one wheel of an automobile having the invention applied thereto:

FIG. 2 is a detail sectional view taken along line 2—2 of FIG. 1;

FIG. 3 is a sectional view taken along the line 3—3 of FIG. 2; and

FIG. 4 is an exploded view of the clamping brackets of the lowering means of the invention.

This application is a continuation-in-part of earlier filed application Ser. No. 790,538 filed February 2, 1959.

Referring now more particularly to the drawings, in FIG. 1, numeral 10 designates a front wheel suspension of an automobile. Numeral 12 designates diagrammatically a portion of the automobile frame or chassis having an upper spring seat 13. The structure shown in the figure is a diagrammatical representation by way of example of the front axle suspension in a 1958 Chevrolet automobile. Numeral 16 designates a bracket member which supports the front wheel, this member being pivotally attached to the chassis at 18 to provide for relative movement between members 12 and 16.

The coil spring in FIG. 1 is indicated by numeral 22. It is seated between upper spring seat 13 and lower spring seat 23 which is on the upper side of link 16. Installed within the coil spring 22 is a shock absorber 24. (See FIG. 2.)

FIG. 2 shows the lowering means in position clamping three convolutions of the coil spring 22 together. FIG. 4 shows in detail a preferred form of the clamping means whereby a part of the coil spring is inactivated. The clamping means comprises a pair of similar brackets or members 27 and 28 each having a flat portion as shown at 29 and 30. Each of the brackets has an extending circular flange or lip surrounding a circular opening as shown at 32 and 33. These lips have a diameter adapting them to fit snugly within a convolution of the coil spring as may be seen in FIG. 2. Each of the brackets 27 and 28 has oppositely extending lugs as shown at 37 and 38 of the bracket 27 and 40 and 41 of the bracket 28. These lugs are disposed oppositely each other and a pair of through bolts or cap screws 45 and 46 are provided which extend through the lugs of the two brackets and are engaged by nuts as shown at 49 and 50 and lock nuts 51 and 52 for holding the brackets together.

The lips 32 and 33 extend oppositely as shown and center the brackets 27 and 28 with respect to spring 22. The openings in the brackets accommodate shock absorber 24. Lower spring seat 23 has an upturned flange 25 which fits within the end of spring 22. The barrel of shock absorber 24 has a cross member 34 at the bottom, through which extends member 35 attached to spring seat 23 by bolts as shown. The upper end of shock absorber 24 is bolted to upper spring seat 13.

The technique of installation of the lowering means by way of example is very simple and may be done by one having a minimum of mechanical skill and aptitude and with tools of the most simple type. In making the installation, the car is jacked up under the bumper and the wheels blocked. With the shock absorber removed a bracket is inserted between convolutions preferably starting at the third coil from the bottom, the next three convolutions forming a group to be compressed, that is clamped together. The top or upper bracket is inserted between convolutions measuring three convolutions up from the one engaged by the lower bracket. Convolutions are counted, counting on the front face of the coil and also the rear face to make sure that three convolutions are engaged by both of the brackets so that the assembly appears as shown in FIG. 2. The brackets are installed with the lips towards each other as shown. With the brackets or clamping devices in place, the cap screws or bolts 45 and 26 are then inserted from the top through the extending lugs of the brackets 27 and 28. The nuts are then applied loosely. The shock absorber is then reinstalled and the car is let down from the jack. To determine the exact amount of drop desired, a measurement is made from the bottom of the bumper to ground. The nuts are tightened progressively until three convolutions are tightly compressed together. After installing the lowering means on one side of the automobile, the procedure is repeated on the other side and the same measurement may be made again and then any minor adjustments may be made as necessary to insure that both sides are equal. The lock nuts 51 and 52 may then be set up on each cap screw so that it will lock as a jamb nut insuring that the installation remains firmly, effectively and rigidly in place.

As may be seen, the installation of the lowering means clamps a group of adjacent convolutions of the coil spring together de-activating that part of the spring and eliminating or reducing the spacing between convolutions and lowering the automobile by that amount. As pointed out, preferably a group of three convolutions starting at the third convolution from the bottom is utilized. However, the invention may be applied using a different number of convolutions or de-activating different portions of the coil spring. The means for lowering are extremely simple but yet very effective for their purpose and, as can be observed by those skilled in the art, extremely easy of installation, enabling virtually any automobile owner to make the installation. The effect, as pointed out, is to lower the automobile. The device may be used only at one end or both ends and is universally adaptable to coil springs including those having a part such as a shock absorber installed inside the spring.

The foregoing disclosure is representative of a preferred form of the invention and is to be interpreted in an illustrative rather than in a limiting sense. It is to be understood that various modifications and alternatives may occur to and be adopted by those skilled in the art without departing from the spirit and scope of the invention, the boundaries of which are to be in accordance with the scope of the claims appended hereto.

I claim:

1. In combination with an automobile having coil springs, means for lowering the normal height of the automobile comprising means for de-activating a predetermined number of convolutions of each of a plurality of said coil springs, said means comprising members engageable with convolutions of a coil spring and adapted to rigidly clamp a plurality of convolutions together to eliminate spacing between them and thereby reduce the extended length of the coil spring, said members each having a conformation to hold it in position adjacent a coil convolution and an aperture to accommodate a shock absorber installed within the coil spring.

2. The combination of claim 1 wherein said means comprises two members engageable on opposite sides of a group of adjacent convolutions, said members being attachable together.

3. The combination of claim 2 wherein said members have portions insertable between adjacent convolutions and circular lips shaped to fit into a coil convolution, and lugs at the ends of the said members adapted for securing adjacent ends of said members together.

4. The combination of claim 1 including bolt means engageable with said members adapted to reduce the spacing between convolutions upon tightening of the bolt means.

5. The combination of claim 3 wherein said circular lips face toward each other.

6. In combination with an automobile having coil springs having shock absorbers installed within the springs, means for lowering the normal height of the automobile comprising means for clamping together a group of adjacent convolutions of a coil spring, said means comprising at least one member insertable between convolutions having a shape to interfittingly engage a convolution and having a central aperture to accommodate a shock absorber and bolt means engageable with said member at spaced points and adapted to act on said member to draw adjacent convolution portions toward each other.

7. The combination of claim 6 comprising two similar spaced members in opposed positions on opposite sides of a group of convolutions, the said members being adapted to be drawn together by the bolt means for clamping the group of convolutions.

8. The combination of claim 7 wherein each of said members has a circular lip of a diameter to fit within a coil convolution, said lips facing toward each other.

References Cited in the file of this patent

UNITED STATES PATENTS

| 2,033,298 | Pribil | Mar. 10, 1936 |
| 2,896,940 | Lightbourn | July 28, 1959 |

FOREIGN PATENTS

| 405,216 | Germany | Oct. 31, 1924 |